Patented Aug. 8, 1939

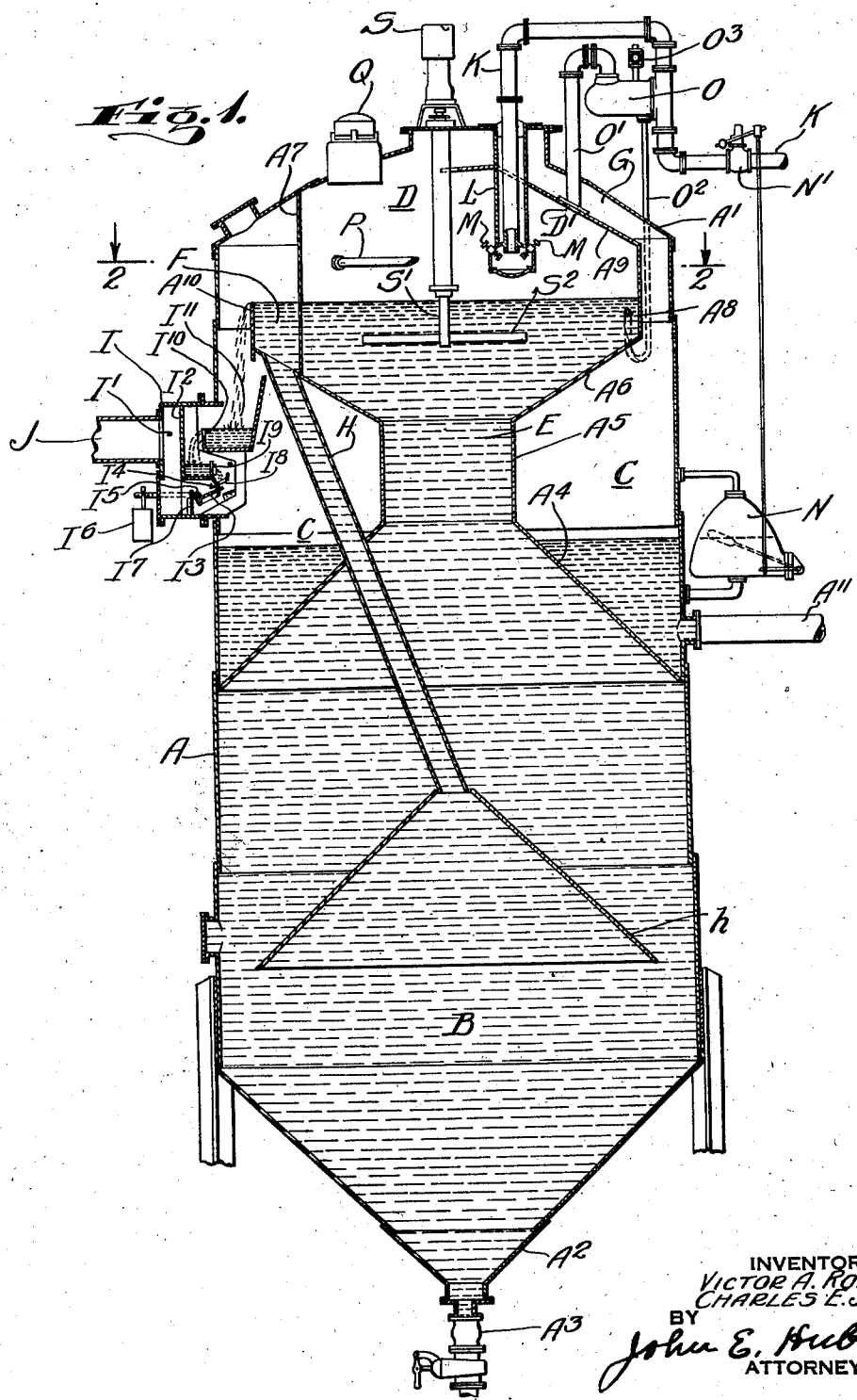

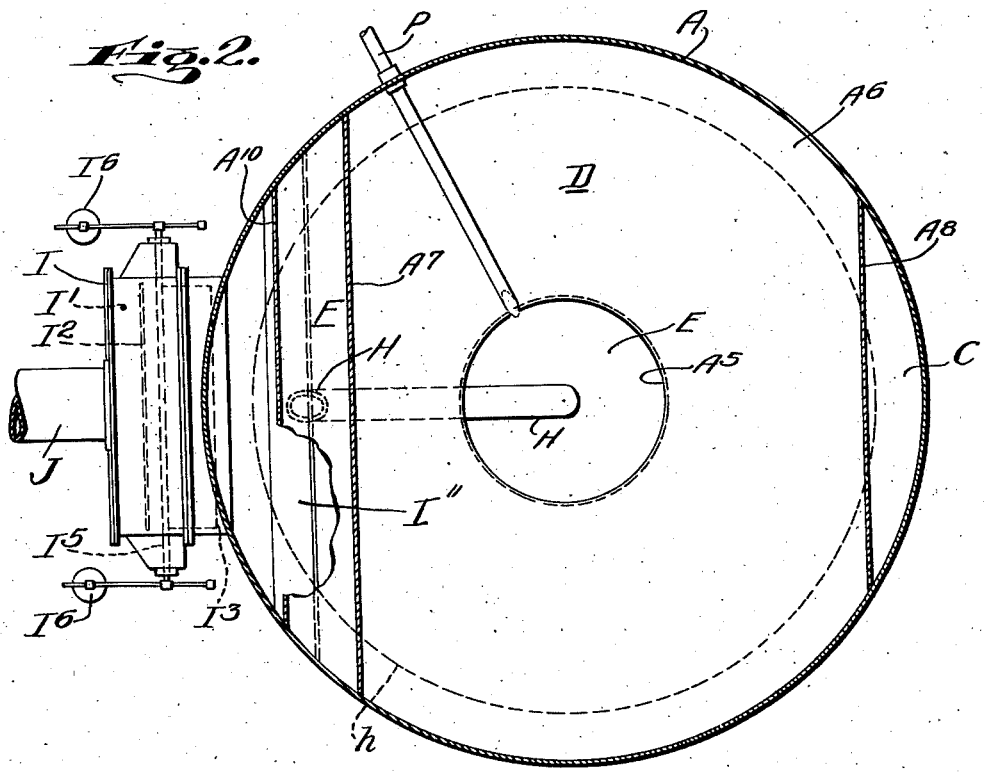
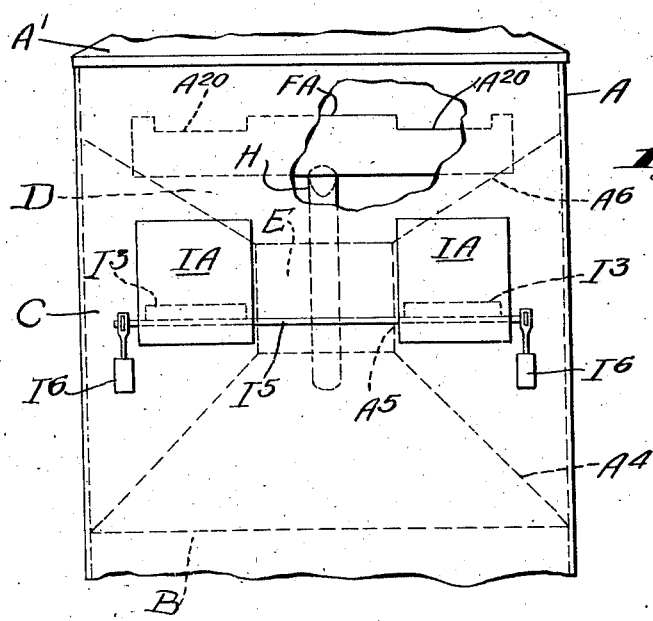

2,168,584

UNITED STATES PATENT OFFICE 2,168,584

WATER PURIFYING AND DEGASIFYING APPARATUS

Victor A. Rohlin and Charles E. Joos, Philadelphia, Pa., assignors to Cochrane Corporation, Philadelphia, Pa., a corporation of Pennsylvania Application September 9, 1937, Serial No. 162,958

7 Claims. (Cl. 210—14)

The general object of the present invention is to improve apparatus for subjecting water to a so-called hot-process water softening treatment, and to a degasifying treatment eliminating air initially contained in the water and gases liberated from the water by the softening treatment.

Prior patents, Nos. 2,047,291 and 2,047,292, each granted July 20, 1935, disclose apparatus units of various forms, each including a single enclosing tank structure, and being adapted for use in a hot-process softening and degasifying method devised by one of us, namely, Victor A. Rohlin. Said units are each characterized primarily by the fact that the single tank structure thereby encloses means for subjecting the water to a preliminary heating treatment and to a water softening and sedimentation treatment, combined with means for subjecting the softened water to a further or final degasifying and heating treatment in which the water is subjected to steam atomizing action. Hot-process water softening apparatus units are customarily of large size, and the units of said prior patents are characterized by provisions for minimizing the bulk of the apparatus unit required for a given water treating capacity, and for minimizing the pumping capacity and energy required to effect a gravity flow of the water through the unit.

The present invention is intended to provide improved apparatus of the general character, and adapted for use in the practice of the method of water treatment disclosed in said prior patents, and with which the major advantages attained with the apparatus of said prior patents are obtained, and in some respects augmented.

The present invention is characterized in particular by the form, disposition and inter-connection of the different compartments or sections into which the tank space is divided. In accordance with the present invention, the final heating and degasifying compartment or section of the tank space extends annularly about a waist or neck portion of a chamber comprising a lower sedimentation compartment and an upper preliminary water heating compartment, communicating with said sedimentation compartment through said waist portion. The portion of each of said compartments adjacent said intermediate portion is preferably tapered or conical, so as to increase in horizontal cross section as the distance from the waist or neck portion increases. The described form and disposition of the three compartments is advantageous not only from the standpoint of space and head loss economy, but is of especial importance when the water in the preliminary heating compartment is subjected to a stirring action, giving the water a circular movement about the tank axis, to further the coagulation of impurities. In such case, the velocity of the water is desirably increased as a result of the law of conservation of moment of momentum, when the water passes from the upper preliminary heating compartment into the passage of smaller diameter, connecting the preliminary heating and sedimentation chambers.

In its preferred form, the present invention is characterized also by the form and disposition of the means for withdrawing water from the sedimentation chamber and passing it into suitable contact with the atomizing steam, and for passing steam and liberated gases from the final into the preliminary heating compartment.

The various features of novelty which characterize the invention are pointed out with particularity in the claims annexed to and forming a part of this specification. For a better understanding of the invention, however, its advantages, and specific objects attained with its use, reference should be had to the accompanying drawings and descriptive matter in which we have illustrated and described a preferred embodiment of the invention.

Of the drawings:

Fig. 1 is a somewhat diagrammatic elevation in section of a preferred embodiment of the present invention;

Fig. 2 is a plan section on line 2—2 of Fig. 1; and

Fig. 3 is a diagrammatic elevation illustrating a modification.

In the drawings, A represents a vertical tank, which having a dished upper end or head portion A', with its convex side uppermost, and a conical bottom portion $A^2$ with a valve controlled sludge outlet $A^3$ at its lower, apex end. Partition means divide the tank space into an annular final degasifying compartment C, which surrounds the waist or intermediate connecting passage portion E of a chamber including a lower sedimentation compartment B and an upper preliminary heating compartment D, each substantially larger in horizontal cross section than the portion E.

The top wall $A^4$ of the sedimentation compartment B which has much larger volume than the other compartments, and occupies all the lower portion of the tank space is in the form of a frustum of a hollow cone, coaxial with the tank and having its lower larger end extending into contact with, and secured, as by welding, to the tank wall. The upper end edge of the wall part $A^4$ is welded, or otherwise connected to the lower end of a tubular part $A^5$ coaxial with the tank and forming the wall of the passage E.

The bottom wall $A^6$ of the compartment D is in the form of a frustum of a hollow cone, coaxial with the tank. The upper and larger end of the wall part $A^6$ extends into contact with, and is secured, as by welding, to the tank body except as upper portions of part $A^6$ between each of the hereinafter mentioned vertical plates $A^8$ and $A^{10}$ and the adjacent tank wall portion, are cut away. A vertical plate $A^7$ alongside the plate $A^{10}$, and between the latter and the tank axis, and having vertical edge portions secured to the tank wall, and having its top and bottom edge portions secured to the top head of $A^1$ and wall part $A^6$, respectively, separates the chamber D from the portion of the compartment C between the plate $A^7$ and the adjacent portion of the tank wall. The plate $A^8$ is parallel to the plate $A^7$ and at the opposite side of the tank axis. An inclined plate $A^9$ is connected at its lower end to the upper edge of the plate $A^8$ and extends alongside, but is spaced and placed away from the adjacent portion of the tank head $A^1$. The plates $A^8$ and $A^9$ and adjacent portions of the tank body and head $A^1$, thus provide a passage G through which steam and liberated gases may pass from the compartment C into the compartment D. From the latter all gases separated from the water in the apparatus, and some water vapor mixed with the gases, are discharged into a vent condenser, as hereinafter described.

The previously mentioned parallel partition plates $A^7$ and $A^{10}$ and the portion of the partition part $A^6$ extending between and connecting the lower edges of plates $A^7$ and $A^{10}$, unite to form a water pocket or trough space F, which receives water through a conduit H from the sedimentation chamber B. From the space F, the water flows over the plate $A^{10}$, and falls through a subjacent portion of the compartment C into the hereinafter described means provided for subjecting the water to a steam atomizing action. A conduit H, which is inclined upwardly away from the axis of the tank, extends through the partition part $A^4$ and has its lower end connected to the upper, small diameter end of a conical part $h$ coaxial with the tank A, and within the sedimentation chamber B and intermediate the upper and lower ends of the latter. The part $h$ forms the body of a sort of inverted funnel, of which the part H is an inclined spout portion, through which water which has been subjected to sedimentation in the compartment B is passed into the water pocket or chamber F.

The steam atomizer provisions shown in the accompanying drawings, are similar in character to those shown in the above mentioned Patent 2,047,291. In the form shown in Figs. 1 and 2, they comprise a box-like structure I, extending through the wall of the tank body at the opposite side of the tank from the passage G. The structure I includes an outer steam inlet chamber I' which receives steam through a steam supply pipe J, at a pressure which may be different in different installations, and may be only from 1½ lbs. above atmospheric pressure, in some installations, and as high as 40 lbs. above atmospheric pressure in other installations. From the chamber I', the steam passes under a baffle $I^2$, and thence between a valve $I^3$ and its seat $I^4$, into the compartment C. The valve $I^3$ is in the form of a metal plate, or flat bar, carried by a horizontal shaft $I^5$, which is biased by an external counterweight or weights $I^6$ for movement into position in which a free edge portion of the valve $I^3$ engages the metal plate edge forming the seat $I^4$. A flexible plate $I^7$ bearing against the hub portion of the valve $I^3$ constitutes a leakage preventing device which serves to substantially prevent flow of steam into the compartment C, except through the space between the valve $I^3$ and port $I^4$.

The steam entering the chamber C through the space between the valve $I^3$ and its seat $I^4$, contacts with and atomizes the water passing in distributed streams downward from the perforations or slits in an inclined plate $I^8$ onto which water is discharged through perforations or slits in a vertical plate $I^9$. The latter forms a side wall of a water pocket or trough above the valve member $I^3$, and receives water discharged through perforations or slits in a vertical outer side wall $I^{10}$ of a trough or water box $I^{11}$ open at its top. The latter is in position to receive the water flowing out of the pocket F over the plate $A^{10}$.

The bias force tending to close the valve member $I^3$, is adapted to create a suitable differential of a pound or less, between the steam pressures in the inlet chamber $I^1$ and compartment C, required for a velocity of steam flow between the valve $I^3$ and seat $I^4$, high enough to effectively atomize the water passing downward through the pervious plate $I^8$. The passage of the water over plate $A^{10}$ and through the pervious plates $I^8$ and $I^9$, insures a desirable uniformity along the length of the atomizer of the water coming to the atomizer.

The water to be treated passes into the tank structure as shown, through a vertical pipe K extending downwardly through a portion of the upper tank end head A'. At its lower end, the pipe K discharges into a surrounding chamber L coaxial with the pipe K, and supported by the head A', and provided with a multiplicity of loaded water spraying or atomizing devices M, each adapted to deliver water in upwardly directed sprays, into the steam space within compartment D above the water level in the latter. Further illustration or description of the means shown for spraying water into the chamber D is unnecessary, as said means may be, and as shown, is like the means employed for the same purpose in Patent 2,047,291.

The heated, purified, and degasified water is discharged from the space C through an outlet $A^{11}$ which may be pipe connected to the inlet of a boiler feed pump (not shown), or to some other device or place to which the treated water is delivered. The supply of water through the pipe K to the compartment D, may be varied by a float regulator device N and water supply valve N' of customary type, as required to maintain the desired height of water level in the compartment C.

As shown, the water passing into the chamber C through the valve N' and pipe K also traverses the water passages or space of a vent condenser O, such as is customarily employed in water heating and deaerating apparatus. A pipe O' connected to the vent or vapor outlet D' from the compartment D passes gases and uncondensed vapor into the vapor or condensing space of the condenser O. Water of condensation formed in said vapor space is returned to the compartment D through the drain connection O². Uncondensed gases and vapors pass out of the vapor space of the vent condenser through an outlet O³, which may open to the atmosphere, or be connected to an air pump or other vacuum creating device, accordingly as the pressure within the compartment D is, or is not, slightly above atmospheric pressure.

As the pressure in the compartment C may be subject to appreciable temporary variations, and an appreciable reduction of the pressure within the apparatus below its normal value is objectionable, we advantageously employ an automatic vacuum breaking valve device Q which operates in a well-known manner to admit atmospheric air into the compartment D whenever necessary to prevent the pressure in that compartment from falling below a predetermined minimum. As shown, a water purifying chemical agent or mixture, such as customarily used in hot process water softening apparatus, is supplied to the compartment D by means shown as including a conventional supply pipe P.

To further the reaction of impurities which should be precipitated, we provide means for stirring the water in the compartment D. The stirring means as shown, comprises a motor S supported on the tank head A', and having a depending vertical shaft S', extending down into the compartment D, and carrying a horizontal stirring arm or arms S² located slightly below the normal level of the water in the compartment D. That level is determined as will be apparent, by the overflow level from the water space F. Advantageously, and as shown, the shaft S' is coaxial, or substantially so, with the axis of the tank, and the movement of the stirring arms set up a flow of water about the axis of the tank. In normal operation, with water constantly supplied to the compartment D through the nozzles M, the general direction of water flow in the compartment D and through the passage E, will be spirally downward or helical.

A desirable feature of the form and relative disposition of the chambers B and D and connecting passage E, is that as the water passes downward through the conical lower portion of the compartment D, and into the passage E of relatively small diameter, the effect of the law of conservation of moment of momentum tends to a progressive increase in the velocity of the water. Conversely the effect of that law is to diminish the velocity of the water as the latter passes downward through the conical upper portion of the sedimentation space B.

The agitation of the water and its motion due to the action of the stirring means, and the diminishing cross section of the space through which the water moves helically about the tank axis and downward in the passage E, facilitates the precipitation if impurities, by rapidly effecting a uniform mixture of the chemical purifying agent with the water and the continued but more gentle movement of the water in the upper portion of the chamber B augments the rapidity of formation and the size of floc aggregates formed, and thereby directly hastens the precipitation of the impurities. Theoretically, the attainment of the maximum velocity increasing effect of the law of conservation of moment of momentum, the water space in the chamber D should be circular in cross section, and coaxial with the passage E at all levels. The departure from such uniform circularity in cross section, in the construction illustrated, is not significantly objectionable however. The local flow disturbances and eddies, due to the presence of the flat vertical plates A⁷ and A⁸, diminish the general helical velocity of the water but slightly, and somewhat increase the rapidity with which the chemical purifying agent is mixed with the water With the length of the atomizing valve I³ substantially greater than the diameter of the passage E, as shown in Figs. 1 and 2, a portion of the atomized water impinges against the tubular wall A⁵, and hence is not exposed, while in its atomized condition, to contact with steam for as long a time as are the portions of the atomized water which do not impinge against the part A⁵, but move past the opposite sides of the latter. To increase the average time during which the water while in an atomized condition is maintained in its atomized condition in an enveloping steam atmosphere, we may replace the structure I shown in Figs. 1 and 2, by means including two atomizing sections IA, arranged as shown in Fig. 3, so that the water atomized by the steam passing the valve A³ of each section IA, will not impinge against the part A⁵, but will pass at one side of the latter. The sections IA may be complete units, each like the previously described unit I, or they may be arranged to receive water from a common inlet chamber, like the chamber I' of Figs. 1 and 2. The overflow water box FA shown in Fig. 3, differs from the previously described box F, only in that the overflow therefrom is through two weir notches A²⁰ in the upper edge of the plate A¹⁰.

Aside from its above described advantages in respect to the precipitation of impurities, the apparatus illustrated has important practical advantages in respect to space utilization. As will be apparent, the free or upper water surface in each of the compartments C and D, may be substantially greater than half the horizontal cross section of the tank, and a steam space of correspondingly and desirably large cross section, in which the subdivided water is dispersed. As will be apparent, also, the arrangement permits the weight of the tank and its contents to be distributed quite uniformly about the axis of the tank, which is practically important because of the substantial bulk of the tank, the very considerable weight of the water within the tank, and the fact that the cost of tank is minimized by making it of rolled plate metal as thin as is practically possible. The water in the compartment C is distributed symmetrically about the tank axis, and that is substantially true also of the water held collectively in the chamber D and space F.

The use of the present invention does not interfere with the location of the auxiliary parts such as the parts I, K, L, N, O, Q and S, so that their considerable aggregate weight may be suitably distributed about the tank axis.

While in accordance with the provisions of the statutes, we have illustrated and described the best forms of embodiment of our invention now known to us, it will be apparent to those skilled in the art that changes may be made in the form of the apparatus disclosed without departing from the spirit of the invention as set forth in the appended claims, and that in some cases, certain features of the invention may be used to advantage without a corresponding use of other features.

Having now described our invention, what we claim as new and desire to secure by Letters Patent, is:

1. Water purifying and degasifying apparatus comprising in combination, a vertically disposed tank, partition means therein providing a heating and sedimentation chamber and an annular degasifying compartment surrounding an intermediate portion of said chamber substantially smaller in horizontal cross section than the portions of said chamber above and below said intermediate portion, means for passing water successively through said chamber and compartment and for maintaining a steam space in the upper portion of each, comprising water supply means discharging into the steam space of said chamber, an overflow receptacle in the steam space of said compartment, conduit means for passing water from the lower portion of said chamber into said overflow receptacle and means for discharging water from the portion of said compartment below the steam space therein, means for passing steam into the steam space of said compartment, the last mentioned steam space having an outlet for the flow of steam and gases into the steam space of said chamber, and means for withdrawing the gases from the last mentioned steam space.

2. Apparatus as specified in claim 1, including means for passing a chemical purifying agent into the upper portion of said chamber, and for creating a rotative movement of the water above said intermediate portion about the axis of the latter, whereby the increase in the velocity of the water as it passes through said intermediate portion, increases the speed with which said agent is effectively mixed with the water, and the decrease in the velocity of the water as the latter passes into the portion of the chamber below said intermediate portion augments the rapidity of floc formation and the size of floc aggregates formed, and thereby directly hastens the precipitation of impurities.

3. Apparatus as specified in claim 1, including means for supplying a chemical purifying agent to the upper portion of said chamber, and water stirring means in said upper portion revolving about an axis substantially coincident with that of said intermediate portion, and in which the lower part of said upper portion is of a general conical form, decreasing in horizontal cross section as it approaches said intermediate portion.

4. Apparatus as specified in claim 1, including means for supplying a chemical purifying agent to the upper portion of said chamber, and water stirring means in said upper portion revolving about an axis substantially coincident with that of said intermediate portion and in which the lower part of said upper portion and the upper part of the portion of said chamber immediately beneath said intermediate portion, are each generally conical in form and each decreases in horizontal cross section as it approaches said intermediate portion.

5. Apparatus as specified in claim 1, in which the portion of the partition means surrounding the said intermediate portion of said chamber is a tubular part, and in which the portion of the partition means immediately adjacent each end of said tubular part is in the form of a hollow conical frustum having its small diameter end connected to said tubular part.

6. Apparatus as specified in claim 1, in which the means for supplying steam to said degasifying compartment comprises means for discharging steam in a wide, generally horizontal stream, moving transversely to the axis of the tank and comprising portions passing said intermediate chamber at opposite sides of the latter, and in which the water overflowing from said overflow receptacle includes distributed portions falling into said steam stream portions.

7. Apparatus as specified in claim 1, including means for supplying a chemical purifying agent to the upper portion of said chamber, and water stirring means giving the water a helical movement as it passes through said intermediate portion, and in which the upper part of the portion of said chamber immediately beneath said intermediate portion is generally conical in form and decreases in horizontal cross section as it approaches said intermediate portion, whereby the helical motion of the water diminishes at a relatively rapid rate as the water moves through said portion.

VICTOR A. ROHLIN.
CHARLES E. JOOS.